UNITED STATES PATENT OFFICE.

N. CHAPMAN MITCHELL, OF PHILADELPHIA, PENNSYLVANIA.

RECOVERING RUBBER FROM RUBBER-WASTE.

SPECIFICATION forming part of Letters Patent No. 250,943, dated December 13, 1881.

Application filed November 7, 1881. (No specimens.)

*To all whom it may concern:*

Be it known that I, N. CHAPMAN MITCHELL, a citizen of the United States, residing in Philadelphia, Pennsylvania, have invented an Improvement in Recovering Rubber from Rubber-Waste, of which the following is a specification.

My present invention relates to an improvement in, or rather an addition to, the process of recovering rubber from rubber-waste, for which I have filed prior applications for Letters Patent, one of said applications having been filed May 5, 1881, and the other on the 19th day of May, 1881.

The basic process consists in subjecting the rubber-waste to the action of heated sulphuric or muriatic acid of a certain degree of strength, whereby the fibrous portions of the waste are corroded and eliminated, and the impurities, such as zinc and whiting, separated from the rubber.

The second application comprised the subjection of the waste to the joint action of strong sulphuric or muriatic acid and steam by injecting the steam into the mass of acid and waste. When the waste is in the shape of large or closely-cemented lumps the acid cannot act advantageously, owing to the difficulty of obtaining ready access to all parts of the mass, and the object of my present improvement is to facilitate the action of the acid in treating waste of this character.

The improvement consists in subjecting the waste to the action of the vapor of benzine or like hydrocarbon prior to the acid treatment, whereby the rubber in the mass is softened and the subsequent disintegration of the lumps rendered easy, thus materially facilitating the action of the acid or acid and steam thereon.

In carrying out the process the benzine or equivalent hydrocarbon, which will have a softening effect on the rubber, may be introduced, with the acid and waste, into a tank in which the waste is to be treated, the proportion of hydrocarbon being from one to two gallons for each thousand pounds of waste. On the application of heat the hydrocarbon is vaporized, the vapors penetrating all parts of the mass in the tank. After the vapors have performed their duty of softening the mass and preparing it for the subsequent action of the acid or acid and steam they may be permitted to escape from the tank.

I do not desire to claim, in this application, the process of recovering the rubber by boiling the waste in strong sulphuric or muriatic acid to corrode and eliminate the fibrous material and separate the impurities from the rubber, as this is described and claimed in the application filed May 5, 1881, and before alluded to; but

I claim as my invention and desire to secure by Letters Patent—

As an improvement in the art of recovering rubber from rubber-waste by subjecting the said waste to the action of strong and highly-heated sulphuric or muriatic acid, the mode herein described, said mode consisting in first subjecting the waste to the action of hydrocarbon vapors to soften or disintegrate the mass, and then to the action of the strong and heated acid, all substantially as specified.

In testimony whereof I have signed my name to this specification in the presence of two subscribing witnesses.

N. CHAPMAN MITCHELL.

Witnesses:
  HARRY DRURY,
  HARRY SMITH.